June 16, 1925.
N. MININBERG
BATTER DROPPER
Filed Aug. 9, 1922  2 Sheets-Sheet 1
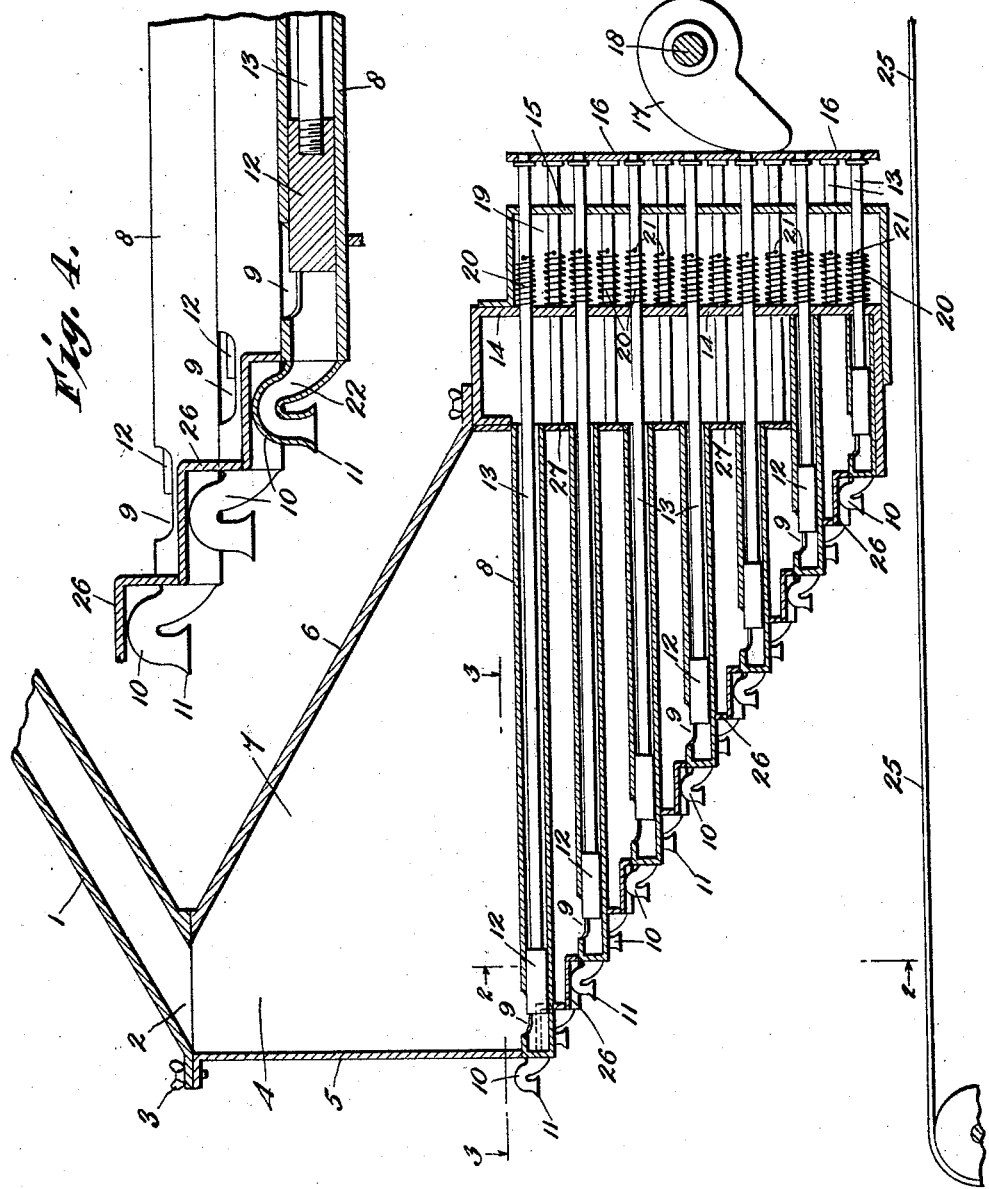
Inventor
Nathan Mininberg, by
Attorney June 16, 1925.                                                                    1,541,990
N. MININBERG
BATTER DROPPER
Filed Aug. 9, 1922                                    2 Sheets-Sheet 2
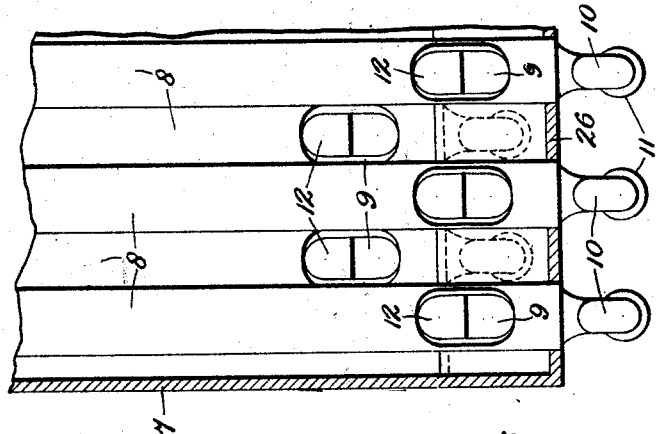
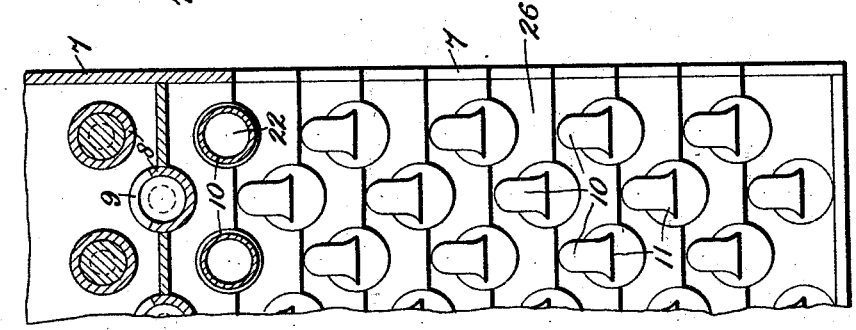
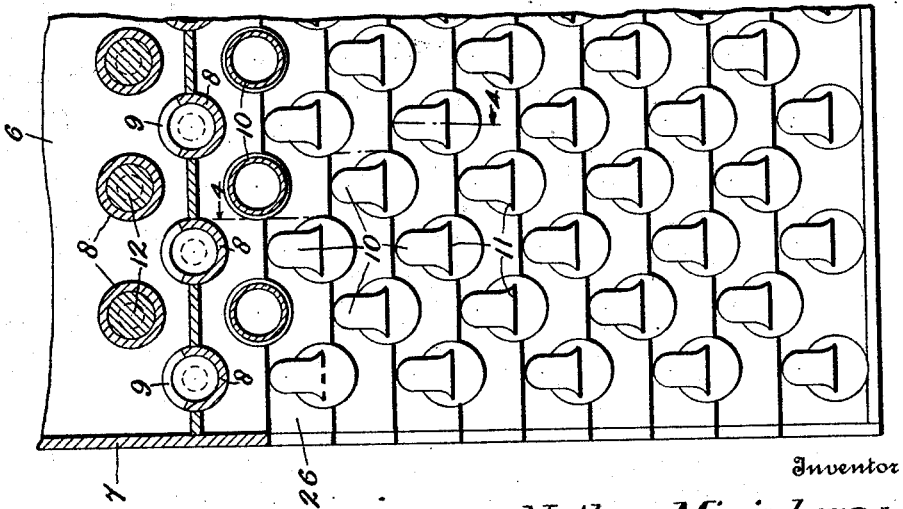
Inventor
Nathan Mininberg, by
Attorney Patented June 16, 1925.

1,541,990

UNITED STATES PATENT OFFICE.

NATHAN MININBERG, OF MINNEAPOLIS, MINNESOTA.

BATTER DROPPER.

Application filed August 9, 1922. Serial No. 580,706.

*To all whom it may concern:*

Be it known that I, NATHAN MININBERG, a citizen of the United States, residing at Minneapolis, in the county of Hennepin and State of Minnesota, have invented certain new and useful Improvements in Batter Droppers; and I do hereby declare the following to be a full, clear, and exact description of the invention, such as will enable others skilled in the art to which it appertains to make and use the same.

This invention relates to an apparatus for dropping batter, dough, and the like, and more especially to a device of this character which is adapted to deposit batter or dough upon a travelling surface for the purpose of producing flaked or puffed breakfast foods, and has for its object to produce a device of this character which will be simple in construction, comparatively inexpensive to manufacture, and more efficient in use than those which have been heretofore proposed.

With the above and other objects in view which will appear as the description proceeds, the invention consists in the novel details of construction and combinations of parts more fully hereinafter disclosed and particularly pointed out in the appended claims.

Referring to the accompanying drawings forming a part of this specification in which like numerals designate like parts in all the views;

Figure 1 is a diagrammatic vertical sectional view, partly in elevation, of an apparatus made in accordance with the present invention;

Fig. 2 is a transverse vertical sectional elevational view, partly broken away, taken on the line 2—2 of Fig. 1, looking in the direction of the arrows;

Fig. 3 is a fragmentary sectional plan view of the parts shown in Figs. 1 and 2; and, Fig. 4 is an enlarged detail sectional elevational view, taken approximately on the line 4—4 of Fig. 2, looking in the direction of the arrows.

In the said drawings the numeral 1 indicates a chute or trough leading from any suitable supply of dough, batter, candy, or the like, the lower end 2 of which chute is detachably connected, as by the wing nut 3, to a receiving chamber or hopper 4. The said chamber 4 is preferably provided with the substantially vertical end wall 5 and the inclined wall 6, as well as suitable side walls 7, as will be clear from the drawings.

Beneath the said chamber 4 there is located a plurality of drop forming and feeding devices each of which comprises a tube 8 provided at or near one end with an opening 9. The end of the said tube, adjacent the said opening 9, is provided with a discharge nozzle 10, which preferably takes the form of an inverted U-shaped member, one leg of which is secured to the end of the said pipe 8, while the other end is flared outwardly as at 11 and forms the discharge mouth from which the drops are discharged.

The tubes 8 are preferably arranged beneath the dough chamber 4 in staggered relation, as seen in end elevation in Fig. 2, and the lower tubes are progressively shorter, as seen in side elevation in Fig. 1. It results from this arrangement that no two tubes discharge in the same vertical and horizontal planes, and therefore when the batter or dough drops are forced from the discharge nozzles 10 they are distributed over a wide surface area so that no two drops touch one another.

Slidably mounted within each of the pipes 8 is a piston or plunger 12 which snugly fits the interior of the said pipes and which is carried by a slidable rod 13 extending through the said pipes and out of their right hand ends, as seen in Fig. 1, through a vertical guiding and supporting plate 14. The said rods 13 also extend through a second guiding and supporting plate 15 and they are all rigidly connected to a vertical plate member 16 whereby they may all be moved in unison by means of a cam 17, rotatably mounted upon a shaft 18, driven from any suitable source of power not shown.

The said vertical supporting and guiding members 14 and 15 form a chamber 19, out of communication with the chamber 4, and each of the said rods 13 is provided, inside of the said chamber 19, with a compression coil spring 20, one end of which 21 is secured to the said rod, while the other end thereof abuts against the surface of the said partition or guiding member 14. It thus results that whenever the rods 13 are moved toward the left, as seen in Fig. 1, by the cam 17, the springs 20 are compressed, and when the said cam 17 ceases to act the said springs will return the said rods toward the right to their initial positions.

The parts are so designed and constructed that the plungers or pistons 12, carried by the said rods 13, are reciprocated across the openings 9, adjacent the left hand ends of the tubes or pipes 8, and the said plungers are of such dimensions as to completely close the said openings when they are at the end of their stroke. When the said plungers are moved to the right, they uncover the said openings 9 and permit portions of the batter or dough within the dough chamber 4 to pass through the said openings 9 into the extreme ends of the tubes 8.

As the plungers are moved toward the left from the positions illustrated in Fig. 1, the dough or batter which has entered the left hand ends of the said tubes or pipes 8 through the openings 9, is trapped therein, and is forced toward the left, as seen in Fig. 1, by the said plungers, into the passages 22 of the discharge nozzles 10. Due to the shape of the said nozzles, the dough is first forced upwardly over the bend therein, and then downwardly, and is discharged from the flared end 11 of the said nozzles in drops onto a travelling metal belt 25, which preferably passes into an oven where the drops are subjected to the action of heat to bake or toast the same. The flaring of the discharge end of the nozzles 10 has a tendency to prevent any excess dough or batter from working its way up on the outside of the said nozzles, thereby maintaining the same in a clean condition at all times and tending to secure uniformity in the size of the drops discharged.

The front or left hand ends of the tubes 8 are preferably supported in a stepped front wall 26, with which the dough chamber 4 is provided, while the rear ends of the said tubes are supported in a substantially vertical wall 27, see Fig. 1.

After the drops of dough have been expelled from the discharge opening of the nozzles 10, the plungers 12 are returned toward the right, as seen in Fig. 1, under the influence of their springs 20, thereby causing a partial vacuum to be formed within the said nozzles 10 which has a tendency to suck any dough remaining therein back into the extreme ends of the pipes or tubes 8. This action also has a tendency to secure uniformity in the size of the drops of dough deposited.

It will, of course, be apparent that any desired number of tubes 8 and nozzles 10 may be provided to provide for any desired production. In one instance in actual practice, an apparatus of this character having 624 such tubes and discharge nozzles has produced 768 pounds of flaked breakfast food per hour.

It will also be apparent that the device is adapted for use not only as a dropper for dough or batter for producing flaked or puffed breakfast foods, but that it may also be employed for dropping candies, marshmallows, jellies, frostings, and the like, upon any desired surface which may be placed beneath the discharge nozzles 10. Furthermore the apparatus is capable of handling not only relatively thick doughs and batters but also mixtures of relatively thin consistencies.

It is obvious that those skilled in the art may vary the details of construction as well as the arrangement of parts without departing from the spirit of the invention and therefore it is not wished to be limited to the above disclosure except as may be required by the claims.

What is claimed is:

1. In a device of the class described the combination of a chamber adapted to receive material to be deposited in drops; a plurality of tubes associated with said chamber in staggered relation and provided with apertures through which portions of said material may enter; flaring discharge nozzles carried by the ends of said tubes; plungers slidably mounted within said tubes adapted to move past said apertures to open and close the same, and to expel the material within said tubes through said nozzles in drops; and means for reciprocating said plungers.

2. An apparatus of the class described comprising a chamber for receiving material to be deposited in drops; a plurality of tubes located beneath said chamber in staggered relation, and provided with apertures adjacent one of their ends through which portions of said material may enter; flaring discharge nozzles connected to said tubes; reciprocating plungers mounted within said tubes, adapted to force material therein through said nozzles; and cam means adapted to simultaneously move said plungers.

3. An apparatus of the class described comprising a chamber for receiving material to be deposited in drops; a plurality of tubes located beneath said chamber in staggered relation, and provided with apertures adjacent one of their ends through which portions of said material may enter; flaring discharge nozzles connected to said tubes; reciprocating plungers mounted within said tubes, adapted to force material therein through said nozzles; rods within said tubes, connected to said plungers; resilient means for moving said rods in one direction; and cam means adapted to simultaneously move said plungers in the other direction.

4. In a device of the class described, the combination of a chamber adapted to receive dough material to be deposited in drops; a plurality of tubes passing through said chamber and provided with apertures through which portions of said material may enter; a plurality of outlets for said tubes disposed in staggered relations and in different horizontal planes; plungers slidably mounted within said tubes adapted to move past said apertures to open and close the same, and to expel the material within said tubes in drops; and means for reciprocating said plungers.

In testimony whereof I affix my signature.

NATHAN MININBERG.